(12) United States Patent
Endejan et al.

(10) Patent No.: US 6,427,918 B1
(45) Date of Patent: Aug. 6, 2002

(54) APPARATUS FOR STORING AUXILIARY ADD-IN CARDS FOR A PORTABLE ELECTRONIC SYSTEM

(75) Inventors: Edward Endejan, Gurnee; Eric Fuhs, Crystal Lake, both of IL (US)

(73) Assignee: Palm, Inc., Santa Clara, CA (US)

( * ) Notice: Subject to any disclaimer, the term of this patent is extended or adjusted under 35 U.S.C. 154(b) by 42 days.

(21) Appl. No.: 09/726,846

(22) Filed: Nov. 29, 2000

(51) Int. Cl.$^7$ .................................................. G06K 7/00
(52) U.S. Cl. ........................................ 235/486; 235/492
(58) Field of Search .................................. 235/486, 492

(56) References Cited

U.S. PATENT DOCUMENTS 4,277,837 A * 7/1981 Stuckert ..................... 235/380
5,949,058 A * 9/1999 Kmura ........................ 235/486

FOREIGN PATENT DOCUMENTS

GB          1567784     *   5/1980

* cited by examiner

Primary Examiner—Harold I. Pitts
(74) Attorney, Agent, or Firm—Wagner, Murabito & Hao LLP (57) ABSTRACT

The present invention provides an apparatus for conveniently storing and protecting auxiliary add-in media cards while complying with the form factor of an electronic device such as a palmtop computer. In one embodiment, the present invention is comprised of an auxiliary add-in card storage apparatus disposed within a flip cover that can be removeably attached to the palmtop computer. The auxiliary add-in cards can be of SD (secure digital) or MMC (multi-media card) or memory stick format. The auxiliary add-in card storage apparatus, in one embodiment, is adapted to be attached to the inside of the flip cover of the palmtop computer. In the present embodiment, the apparatus is further comprised of sleeves adapted to receive the auxiliary add-in cards. The sleeves provide pockets, each of which is configured to receive an auxiliary add-in card. The pockets are further adapted to provide secure retention and protection of the auxiliary add-in cards once inserted into the pockets. The pockets, in one embodiment, are arranged to hold multiple auxiliary add-in cards. The pockets are further arranged to present the add-in cards such that they can be viewed by the user for easy selection thereof.

30 Claims, 10 Drawing Sheets

APPARATUS FOR STORING AUXILIARY ADD-IN CARDS FOR A PORTABLE ELECTRONIC SYSTEM

FIELD OF THE INVENTION

Embodiments of the present invention relate to auxiliary add-in cards used in conjunction with portable electronic devices. More particularly, the present invention provides an apparatus for storing auxiliary add-in cards, e.g., SD (secure digital) or MMC (multi-media cards) or memory sticks, on a portable computer system.

BACKGROUND OF THE INVENTION

As the continuing advances in technology have enabled the further miniaturization of the components required to build computer systems, new categories of portable electronic devices and computer systems have been created. One of the newer categories of computer systems developed has been the portable, hand held, or "palmtop" computer system, commonly referred to as a personal digital assistant or PDA. Other examples of a palmtop computer system include electronic address books, electronic day planners, electronic schedulers and the like. Many corporations have developed and are currently marketing their individual PDAs.

A palmtop computer system is a computer that is small enough to be held in the user's hand and as such is "palm-sized." As a result, palmtops are readily carried about in the user's briefcase, purse, and in some instances, in the user's sleeve. By virtue of its size, the palmtop computer, being inherently lightweight, is therefore exceptionally portable and convenient.

While the continuing miniaturization of computer systems has enabled a user to now carry in their sleeve the equivalent of a computer system that once occupied an entire room, the miniaturization has also reduced the functionality of the palmtop computer system. To support the diminutive form factor of the palmtop computer, certain components and functions normally associated with full-sized computers have been reduced or eliminated. While retaining the form factor of the palmtop computer, the effectiveness and processing capabilities of the PDA, in comparison to a full-sized computer, have therefore been reduced. To conform with the size limitations of the palmtop computer, the hard drive, the component normally utilized for data storage, has been eliminated, and replaced with quantities of RAM (random access memory), ROM (read only memory), and with flash memory.

Conforming with the diminutive size of the palmtop computer, new types of media cards have been developed for the PDA. These new media cards are called auxiliary add-in cards, or are also called secure digital, SD or SSD cards, or multimedia cards or MMCs, or memory sticks. These media cards are designed to be inserted into the PDA, through an accessible expansion slot, thereby providing a means to add functionalities to a PDA while continuing to conform to the size restrictions of the PDA. The advantage of having an expansion slot is to be able to use the auxiliary add-in cards for providing the PDA with an almost endless array of different information and applications. SD and MMC add-in cards, by virtue of their size, at approximately 32 mm long by 24 mm wide by 2.4 mm thick, are just slightly larger than a postage stamp and these new media cards are easily carried by the user, and are also convenient to use.

While the auxiliary add-in media cards, e.g., SD (secure digital) or MMC (multi-media cards) or memory sticks, have overcome some of the above mentioned shortcomings regarding reduced data storage and multimedia functionality of a PDA, they have, by virtue of their small size, created another problem. Although auxiliary add-in media cards are convenient because they are small, these cards are sometimes damaged, or not readily accessible depending on how and where they are stored, and they are prone to being lost due to their small size.

The advantage of having an expansion slot is to be able to use multiple cards for different purposes, but these cards need to be readily accessible. Additionally, a primary advantage of a palmtop computer system is its compactness, so it is also desirable to maintain this attribute. Therefore it would be desirable to store the cards in a safe, protected and convenient location.

Previous attempts at providing storage for auxiliary add-in cards have resulted in storage containers that either store only one card or stack multiple cards on top of each other (analogous to a deck of playing cards.) These options add considerable thickness and bulk to the otherwise thin add-in cards.

Thus exists a need for an apparatus that provides a secure means of storing the auxiliary add-in media cards. An additional need exists for an apparatus that meets the above listed need, and provides a means of protecting the auxiliary add-in media cards against damage. Another need exists for an apparatus that provides a convenient location for storing the auxiliary add-in media cards.

SUMMARY OF THE INVENTION

Accordingly, the present invention provides an apparatus that provides a secure means of storing the media cards. The present invention further provides an apparatus that provides a means of protecting the media cards against damage. Additionally, the present invention also provides an apparatus which further provides a convenient location for storing the media cards. Additionally, the present invention provides an apparatus that achieves the above accomplishments, and which also complies with the form factor of many conventional portable electronic devices, palmtop computer systems, and PDAs.

These and other objects and advantages of the present invention will no doubt become obvious to those of ordinary skill in the art after having read the following detailed description of the preferred embodiments which are illustrated in the various drawing figures.

The present invention provides an apparatus for conveniently storing and protecting auxiliary add-in media cards while complying with the form factor of an electronic device such as a palmtop computer. In one embodiment, the present invention is comprised of an auxiliary add-in card storage apparatus disposed within a flip cover that can be removeably attached to the palmtop computer. The auxiliary add-in cards can be of SD (secure digital) or MMC (multi-media card) or memory stick format or of any other format recognized for storing information on a memory card. The auxiliary add-in card storage apparatus, in one implementation, is adapted to be attached to the inside of the flip cover of the palmtop computer or other portable electronic device. In the present embodiment, the apparatus is further comprised of sleeves adapted to receive the auxiliary add-in cards. The sleeves provide pockets, each of which is configured to receive an auxiliary add-in card. The pockets are further adapted to provide secure retention and protection of the auxiliary add-in cards once inserted into the pockets. The pockets, in one embodiment, are arranged to hold multiple auxiliary add-in cards. The pockets are further arranged to present the add-in cards such that they can be viewed by the user for easy selection thereof. Embodiments of the present invention can also be applied to pagers, cell phones, remote control devices and portable web browsers.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

An apparatus for storing spare auxiliary add-in cards, e.g., SD (secure digital) or MMC (multi-media cards) or memory sticks, in the flip cover of portable electronic device, e.g., a palmtop computer (PDA) is described. In the following description, for purposes of explanation, numerous specific details are set forth in order to provide a thorough understanding of the present invention. It will be obvious, however, to one skilled in the art that the present invention may be practiced without these specific details. In other instances, well-known structures and devices are shown in block diagram form in order to avoid obscuring the present invention.

The present invention is discussed primarily in the context of a portable electronic device, such as a portable computer system, a palmtop computer system, or a personal digital assistant (PDA). However, it is appreciated that the present invention can be used with other types of electronic devices that have an expansion slot and the capability to utilize auxiliary add-in cards therein, including, but not limited to, palmtop computer systems, pagers, cell phones, remote control devices, portable web browsers, etc.

Figure 1:
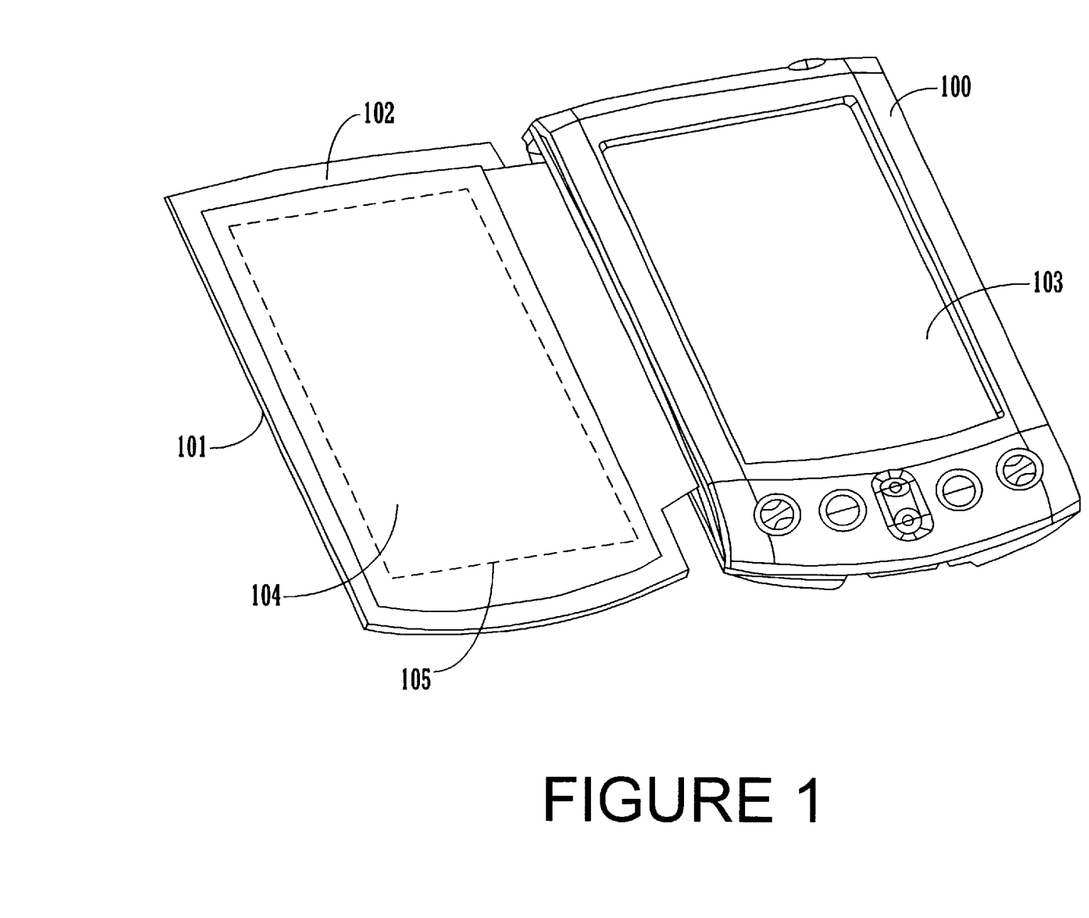
FIG. 1 is an front-view perspective illustration of a palmtop computer with the inside of the front cover exposed, in accordance with one embodiment of the present invention.

With reference now to FIG. 1, shown is a front-view perspective illustration of palmtop computer system (PDA) 100 with inside portion 102 of detachable front cover 101 exposed. Also exposed is display area 103 of palmtop computer 100. The outline of auxiliary add-in card storage apparatus 104, one embodiment of the present invention, is shown, indicated by dotted line 105. It should be appreciated that the external dimensions of auxiliary add-in card storage apparatus 104, as indicated by dotted line 105, are such that when front cover 101 is closed, auxiliary add-in card storage apparatus 104 does not interfere with the closing or securing of front cover 101 to palmtop computer system (PDA) 100, nor does auxiliary add-in card storage apparatus 104 generally come in contact with display area 103.

By storing add-in cards in this fashion, the present invention provides adequate physical protection to the cards while keeping them readily available to the user. The relative size of the cards and the size of the indentation in the PDA device to accommodate the display area 103 allows several cards to be positioned within the region 105. When inserted into 105, the cards can be arranged such that the added thickness of the cards in combination with the thickness of the storage apparatus will fit within the indentations.

Figure 2A:
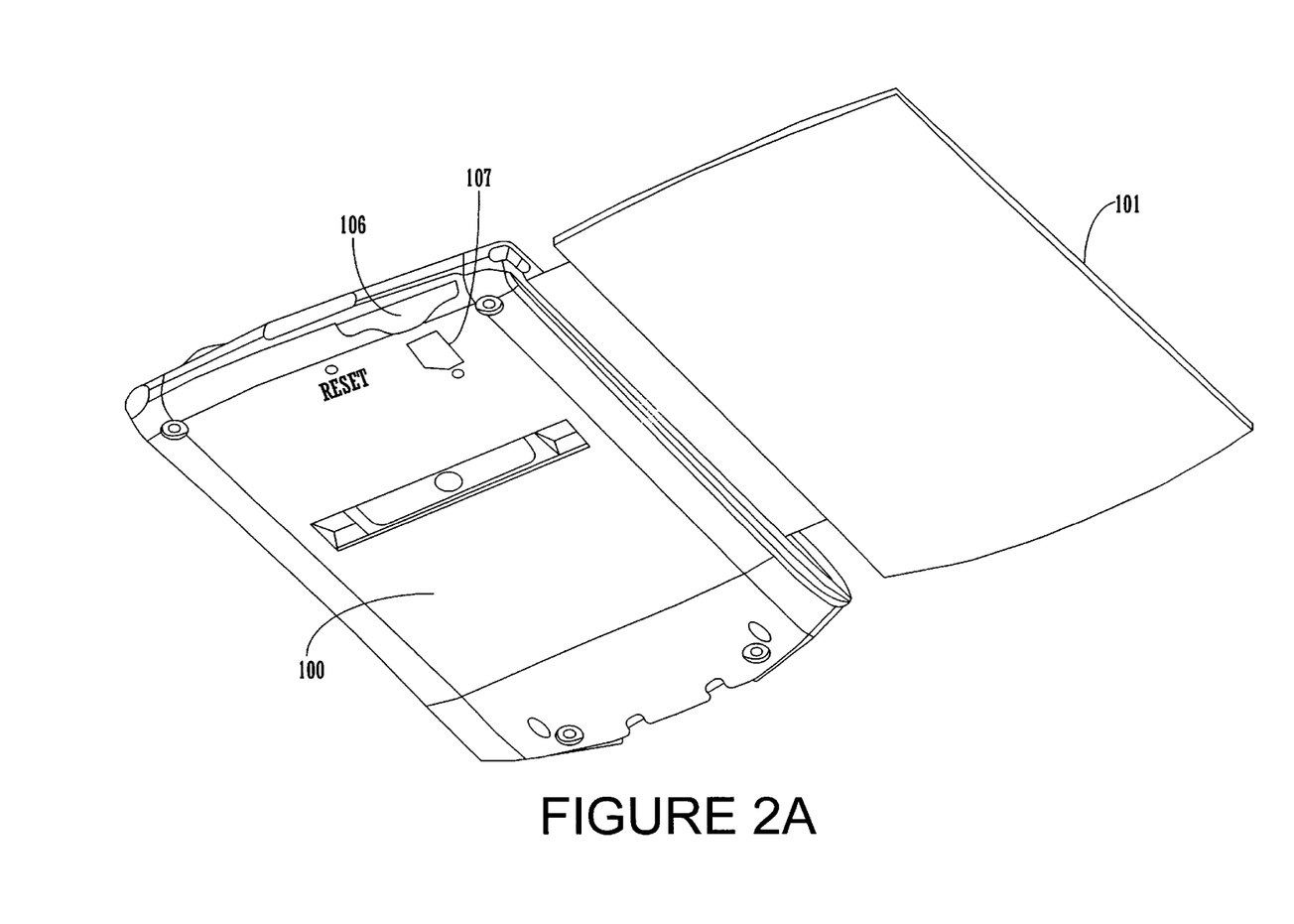
FIG. 2A is a rear-view perspective illustration of a palmtop computer with the front cover opened, in accordance with one embodiment of the present invention.

Now referring to FIG. 2A, shown is a rear-view perspective illustration of palmtop computer system 100 with the back of front cover 101 visible. Expansion slot 106, which provides a means to utilize an auxiliary add-in card once inserted into expansion slot 106 is shown as being disposed on the top left area of palmtop computer system 100. Disposed directly below expansion slot 106 is insert diagram 107, which indicates the direction and manner in which auxiliary add-in cards are to be inserted into expansion slot 106.

Figure 2B:
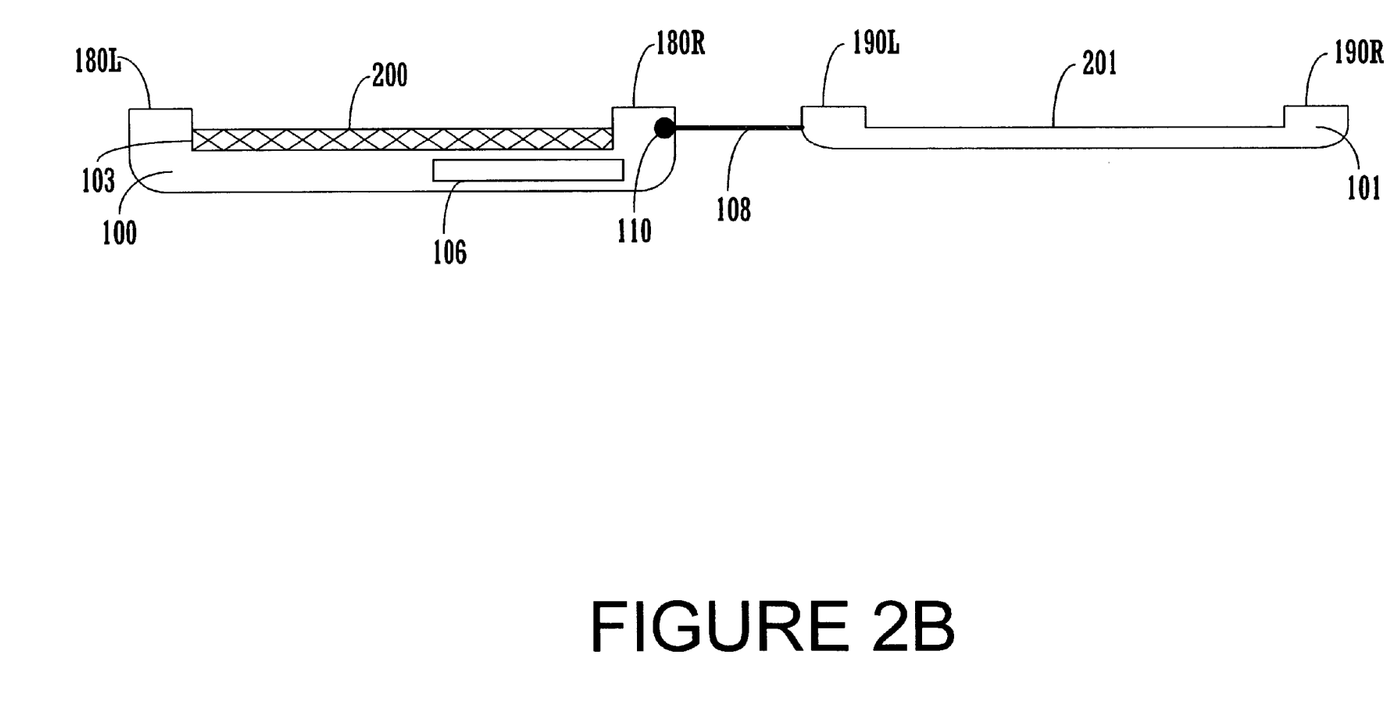
FIG. 2B is a top-edge view perspective illustration of a palmtop computer with the front cover opened, in accordance with one embodiment of the present invention.

Now referring to FIG. 2B, a top-edge view perspective illustration of palmtop computer system (PDA) 100 is shown with front cover 101 opened. On the left, expansion slot 106 of PDA 100 is disposed on the right side of the top surface area of PDA 100 and has display area 103, (indicated with cross-hatching), visible from this perspective. With respect to display area 103 of PDA 100, shown as points of reference are outer edges 180L and 180R of PDA 100 which assist in showing indented region 200. Display area 103 is disposed within indented region 200 as a means to protect display area 103 from damage. Since indented region 200 of PDA 100 contains display area 103, both 200 and 103 have a width of approximately 59 mms and a length of approximately 81 mms, in one embodiment. The depth of indented region 200 with respect to display area 103 is approximately 2 mms, in one embodiment. On the right side of the illustration, front cover 101 is shown removeably attached to palmtop computer system (PDA) 100. Slide hinge device 108, which enables the removeability of front cover 101 from computer 100, is adapted to be inserted and deinserted into slot 110. With attention now to points of reference outer edges 190L and 190R of front cover 101, an indented region 201 is shown. In one embodiment, indented region 201 of front cover 101 has a width of approximately 59 mms and a length of approximately 81 mms to coincide with the dimensions of display area 103. The depth of indented region 201 of front cover 101 is approximately 1.5 mms, in one embodiment.

It should be appreciated that auxiliary add-in cards 110 are, in one embodiment, comprised of the following dimensions. For each card, the length is approximately 32 mms, the width is approximately 24 mms, and the height is approximately 2.4 mms. When the length of two cards are combined, that being 64 mms, and the width of two cards are combined, that being 48 mms, it is readily apparent that the cards, in a two by two configuration as depicted and described in FIGS. 4A–4D, will fit within the physical dimensions of PDA 100 and front cover 101 as described in FIG. 1. It should be further appreciated that the indented portions of PDA 100 and front cover 101, in one embodiment, collectively add up to a height limitation of approximately 3.5 mms. Since the height of add-in card 110 is approximately 2.4 mms, this allows the material that would comprise auxiliary add-in card storage apparatus 104 to be of a thickness of from approximately 0.3 mms to approximately 0.5 mms, and still be within the height limitation as previously discussed.

Figure 2C:
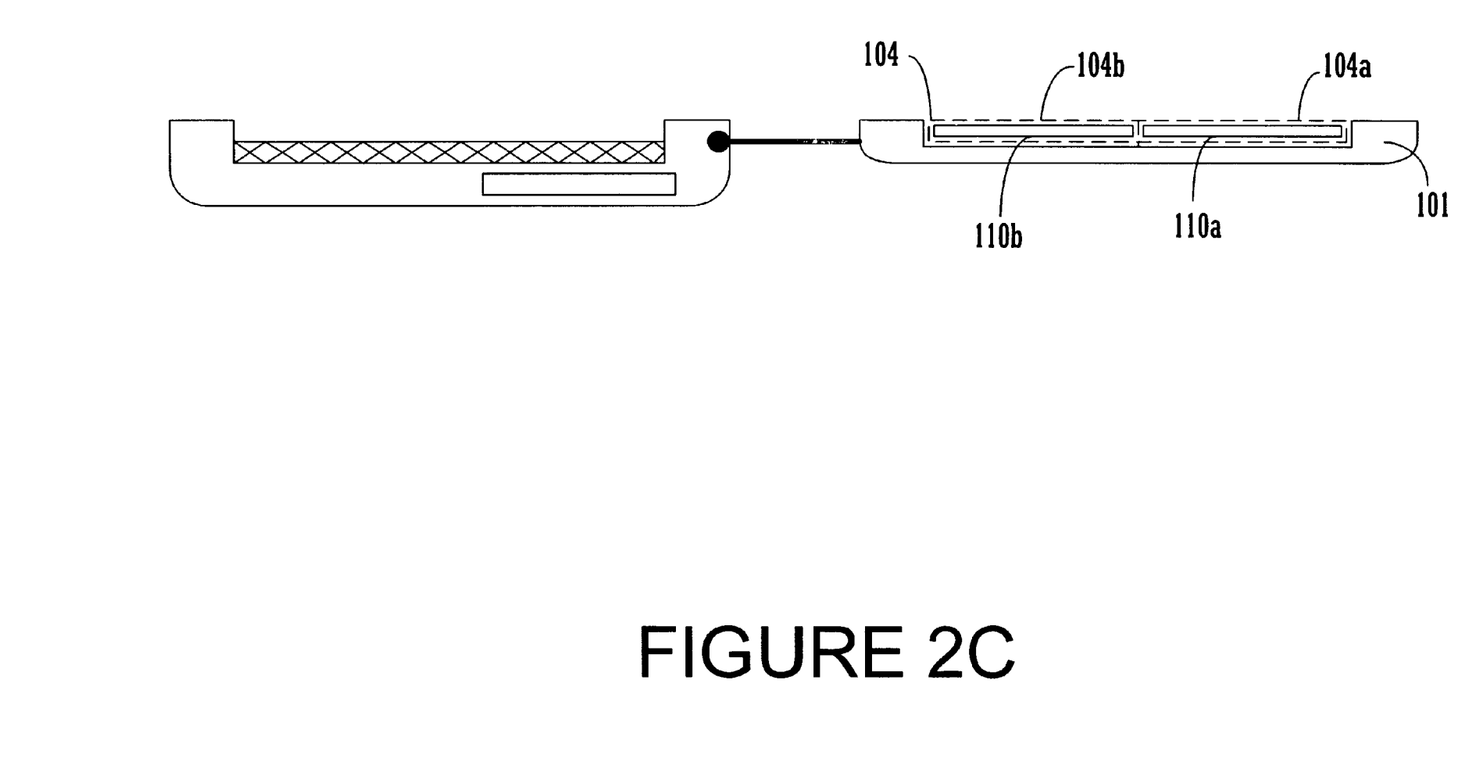
FIG. 2C is a top-edge view perspective illustration of a palmtop computer with the front cover opened and with an auxiliary add-in card storage apparatus attached, in accordance with one embodiment of the present invention.

Referring now to FIG. 2C, front cover 101 is shown with attached auxiliary add-in card apparatus 104, in one embodiment, as indicated with a dotted line. Auxiliary add-in cards 110B and 110A are depicted as having been inserted into auxiliary add-in pockets 104B and 104A, respectively. It should be appreciated that the add-in cards, while depicted as extending above the inside of front cover 101 and by virtue of indented portion 200 as described in FIG. 2B, do not contact display area 103 of PDA 100, nor do the add-in cards restrict the closing of front cover 101.

Figure 3:
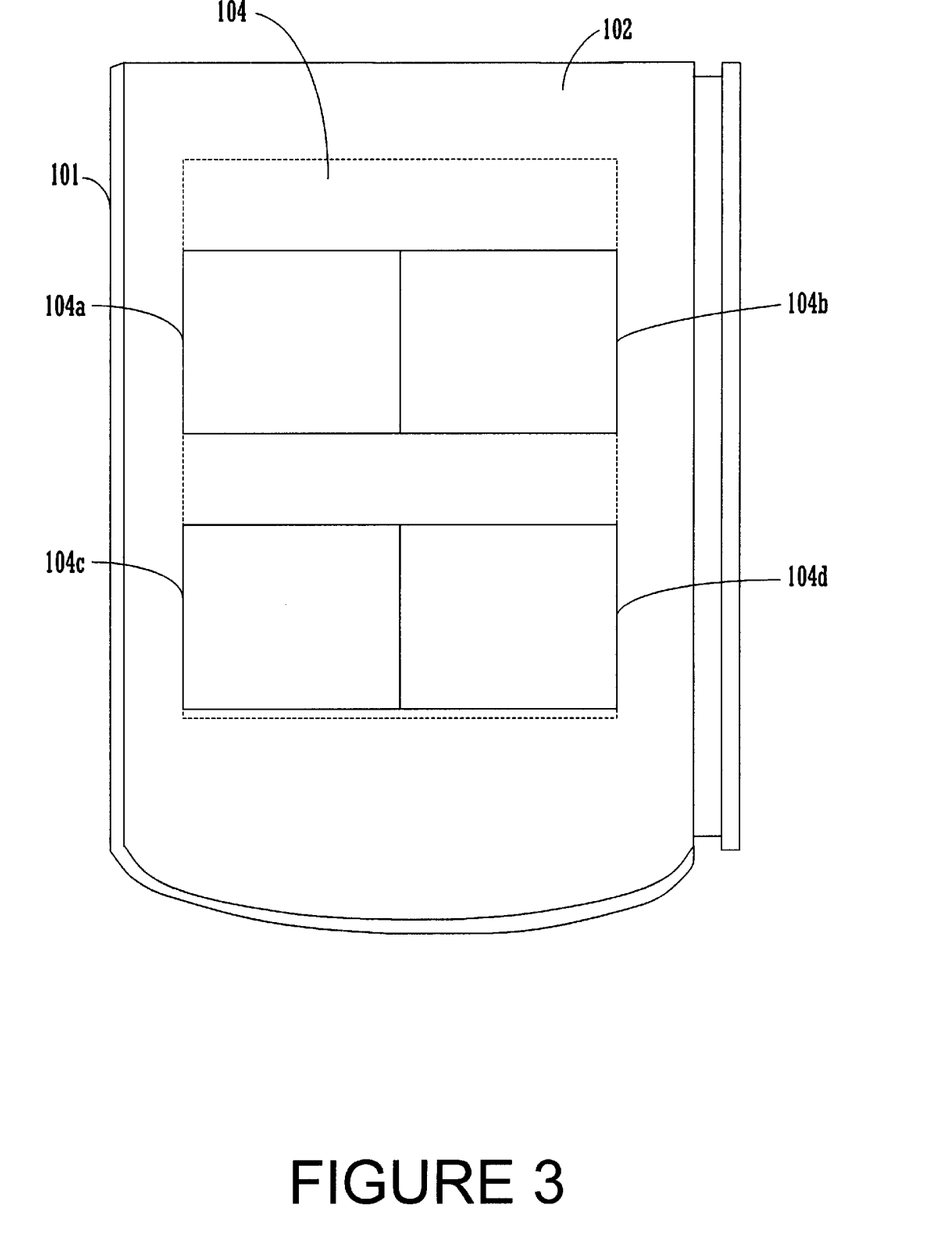
FIG. 3 is a front-view perspective illustration of the inside of the front cover of a palmtop computer including the storage apparatus, in one embodiment of the present invention.

Now with reference to FIG. 3, shown is auxiliary add-in card storage apparatus 104 disposed upon inside area 102 of front cover 101, in one embodiment of the present invention. Shown as integral to auxiliary add-in card storage apparatus 104 are, clockwise from upper left, auxiliary add-in card storage sleeves or pockets 104A, 104B, 104D, and 104C which are adapted to receive the auxiliary add-in cards (not shown).

It should be appreciated that many different thin materials can be used in the construction of storage apparatus 104. In one embodiment, storage apparatus 104 is constructed out of polycarbonate. In another embodiment, storage apparatus 104 is made of mylar. In yet another embodiment, storage apparatus 104 is comprised of cellophane. In still another embodiment, storage apparatus 104 is constructed using polystyrene. In yet a further embodiment, storage apparatus 104 is made out of polyvinyl. In fact, numerous thin materials can be used in the construction of storage apparatus 104 and, as such, the above list of materials should not be considered exhaustive, but used to illustrate the variety of materials available which may comprise one embodiment of the present invention.

It should also be appreciated that while the above mentioned materials may have different levels of opacity which may comprise the auxiliary add-in card storage apparatus, in one embodiment of the present invention, it is preferred that the material be of a clear composition, enabling a user to readily see the contents of the sleeved auxiliary add-in cards. That is, if the pockets are made from clear plastic, it will aid the user in easily identifying the desired card since the entire card label will be visible even while seated fully in its storage location.

It should further be appreciated that while one embodiment of the present invention is depicted and described as being disposed on the inside front cover of a palmtop computer, this should not be construed as a limitation as to the disposition of the auxiliary add-in card storage apparatus. The storage apparatus can be disposed upon an external surface of the palmtop computer system. However, the front cover embodiment provides a more effective protective quality.

Figure 4A:
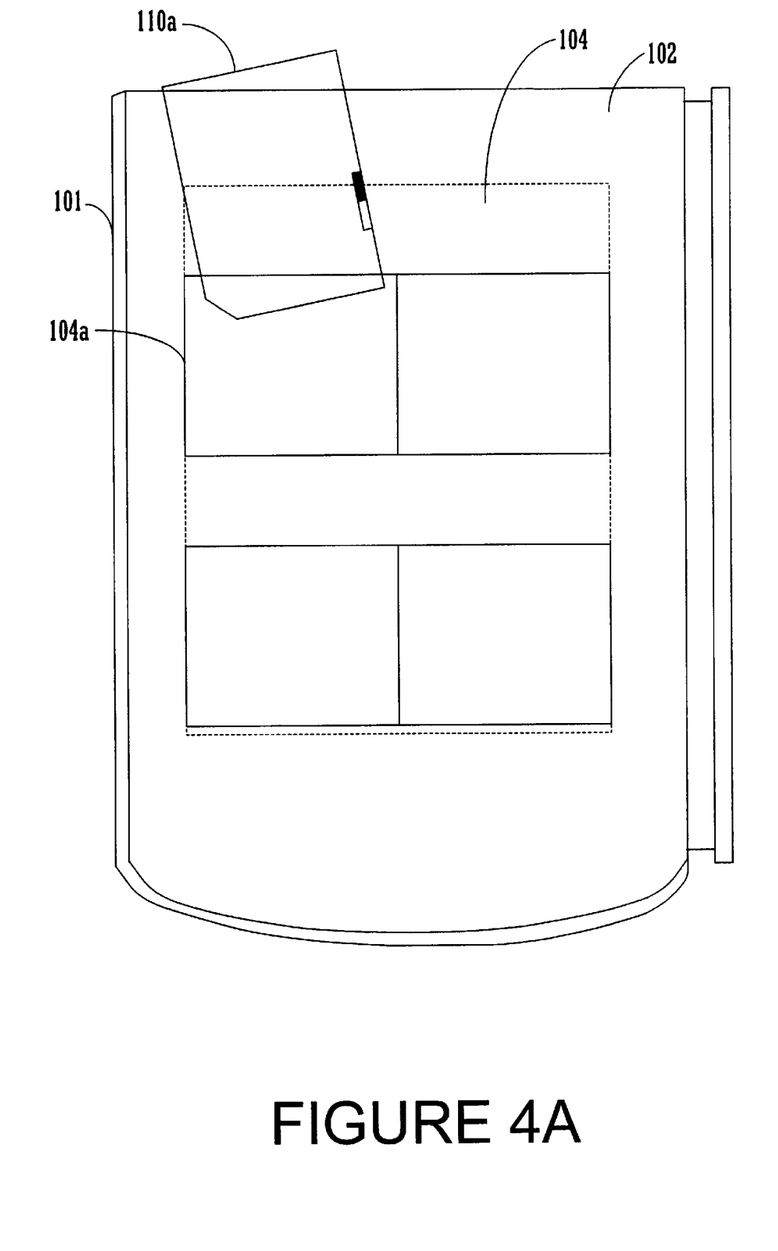
FIG. 4A is a front-view perspective illustration of the inside of the front cover of a palmtop computer including the storage apparatus with one auxiliary add-in card partially inserted, in one embodiment of the present invention.

With reference now to FIG. 4A, auxiliary add-in card storage apparatus 104 is shown, analogous to auxiliary add-in card storage apparatus 104 in FIG. 3. In this example of one embodiment of the current invention, auxiliary add-in card 110A is shown as partially inserted into auxiliary add-in card sleeve 104A. Insertion of auxiliary add-in card 110A into sleeve 104A is best accomplished by holding auxiliary add-in card 110A above sleeve 104A and sliding card 110A between the layers of sleeve 104A in a downward motion. It should be appreciated that the internal dimensions of auxiliary add-in card storage sleeve 104A are such that the retention of auxiliary add-in card 110A in auxiliary add-in card sleeve 104A is friction based.

Figure 4B:
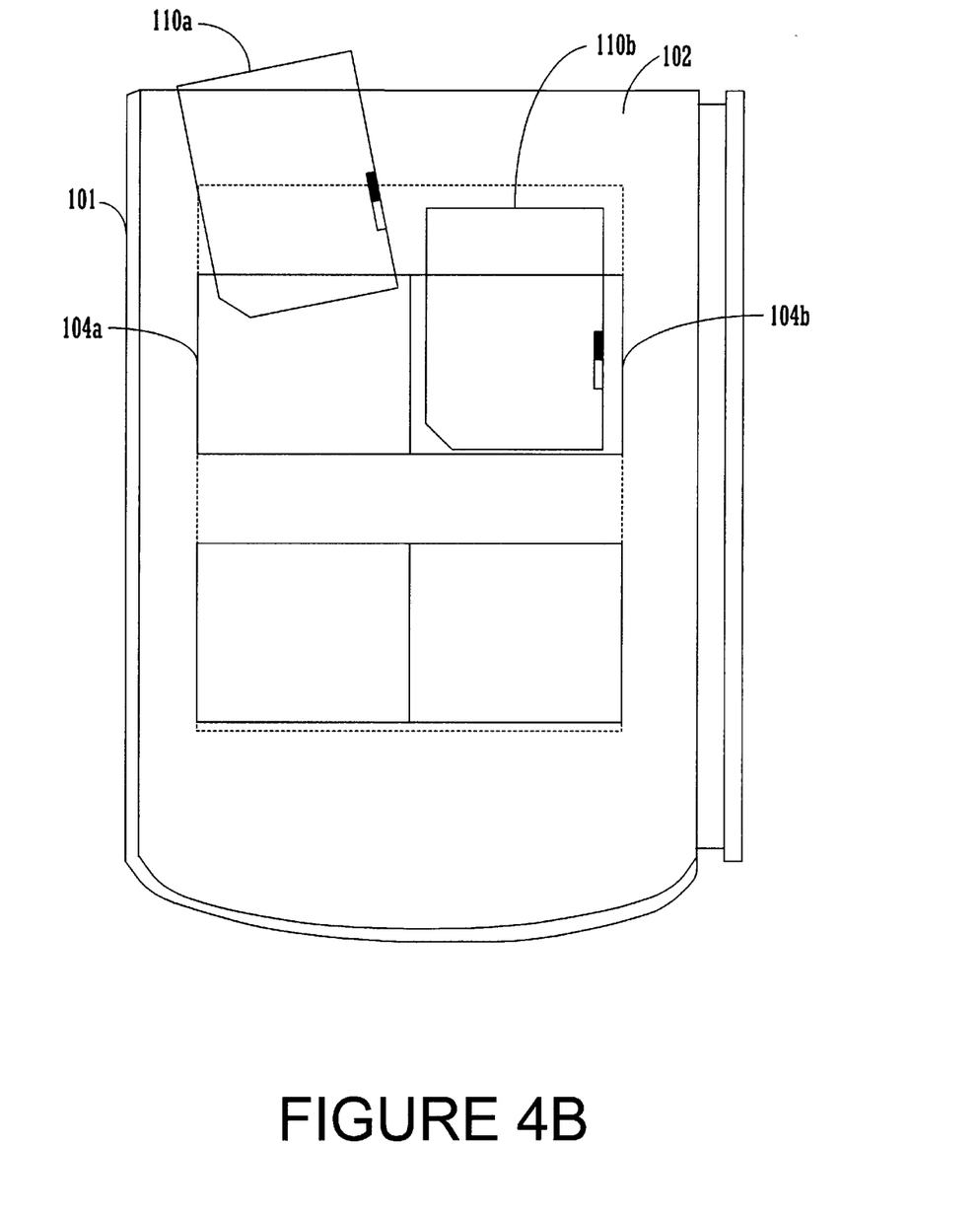
FIG. 4B is a front-view perspective illustration of the inside of the front cover of a palmtop computer including the storage apparatus with one auxiliary add-in card partially inserted, and one auxiliary add-in card fully inserted, in one embodiment of the present invention.

Referring now to FIG. 4B, auxiliary add-in card storage apparatus 104 is shown, analogous to auxiliary add-in card storage apparatus 104 in FIGS. 3 and 4A. In this example, one embodiment of the present invention, auxiliary add-in card 110B is shown as having been inserted into auxiliary add-in card sleeve 104B. This procedure is analogous to the described procedure of FIG. 4A with regard to insertion of the auxiliary add-in card into the auxiliary add-in card storage apparatus.

Figure 4C:
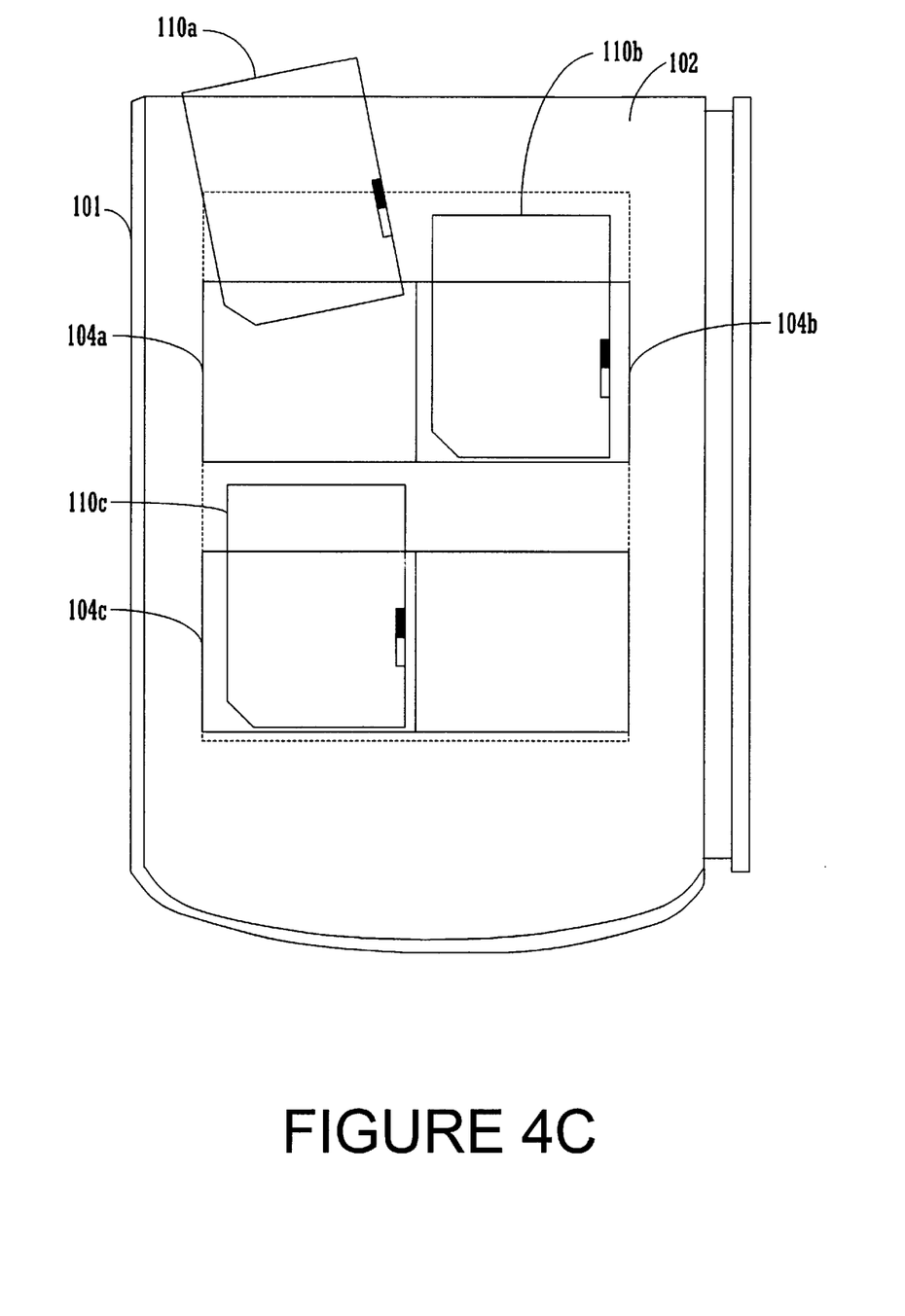
FIG. 4C is a front-view perspective illustration of the inside of the front cover of a palmtop computer including the storage apparatus with one auxiliary add-in card partially inserted, and two auxiliary add-in cards fully inserted, in one embodiment of the present invention.

Now referring to FIG. 4C, auxiliary add-in card storage apparatus 104 is shown and is analogous to auxiliary add-in card storage apparatus 104 in FIGS. 3, 4A, and 4B. In this example, one embodiment of the present invention, auxiliary add-in card 110C is shown as having been inserted into auxiliary add-in card sleeve 104C. Further, auxiliary add-in card 110B is shown as having been inserted into auxiliary add-in card sleeve 104B, wherein each insertion is analogous to the described procedure in FIG. 4A with regard to insertion of each auxiliary add-in card into their respective sleeves.

Figure 4D:
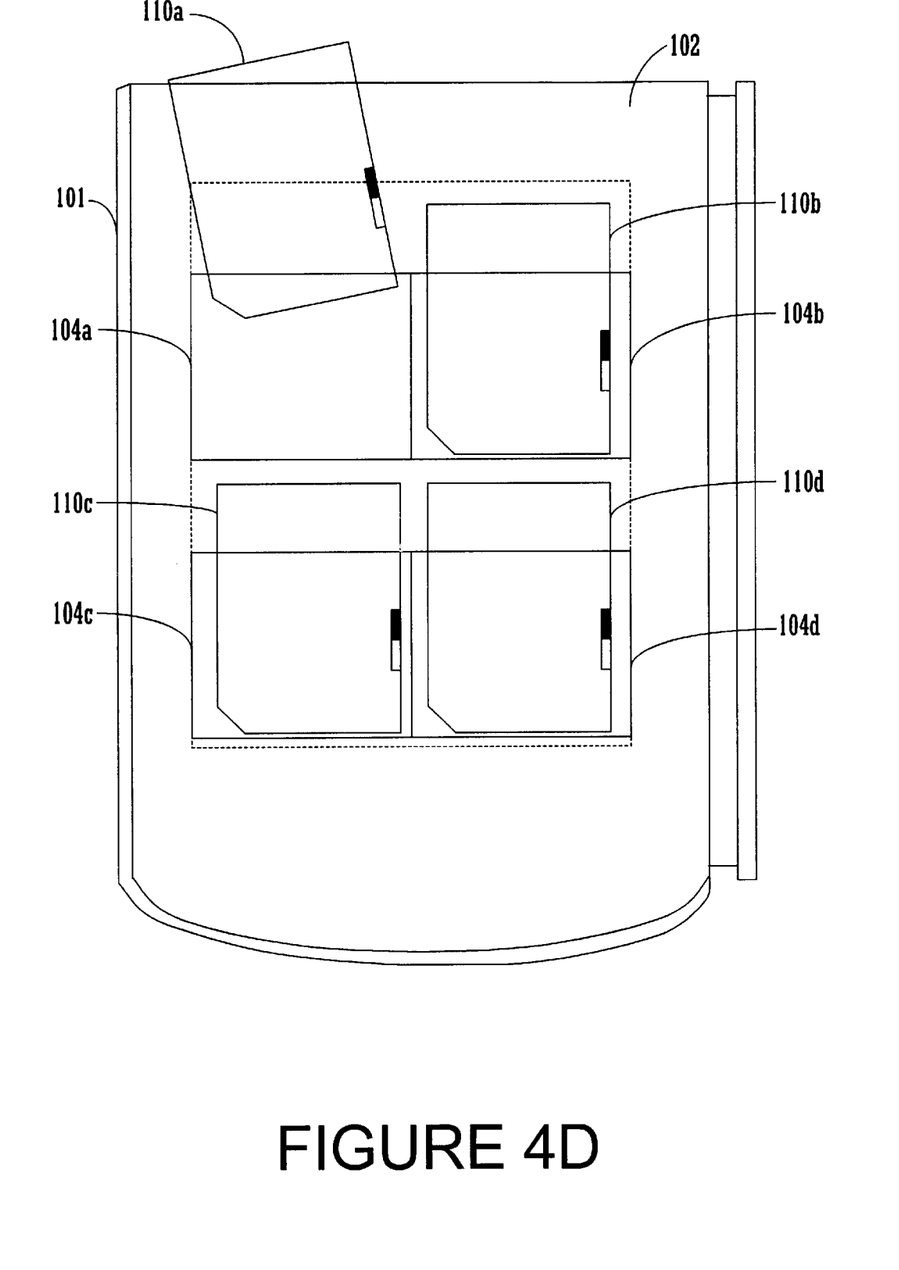
FIG. 4D is a front-view perspective illustration of the inside of the front cover of a palmtop computer including the storage apparatus with one auxiliary add-in card partially inserted, and three auxiliary add-in cards fully inserted, in one embodiment of the present invention.

Now referring to FIG. 4D, auxiliary add-in card storage apparatus 104 is shown and is analogous to auxiliary add-in card storage apparatus 104 in FIGS. 3, 4A, 4B, and 4C. in this example, one embodiment of the present invention, auxiliary add-in card 110D is shown as having been inserted into auxiliary add-in card sleeve 104D. Also, auxiliary add-in card 110C is shown as having been inserted into auxiliary add-in card sleeve 104C. Additionally, auxiliary add-in card 110B is shown as having been inserted into auxiliary add-in card sleeve 104B, wherein each insertion is analogous to the described procedure in FIG. 4A with regard to insertion of each auxiliary add-in card into their respective sleeves.

It should be further appreciated that while the internal dimensions of auxiliary add-in card sleeves 104A, B, C, and D are such that they provide a majority of the friction based retention applied to sleeved auxiliary add-in cards 110A, B, C, and D, it is also noted that the physical proximity of auxiliary add-in card sleeves 104A and B with respect to auxiliary add-in card sleeves 104C and D also provide additional retention regarding auxiliary add-in cards 110C and D. It should also be appreciated that the depressed region of inside area 102 of front cover 101 of palmtop computer system 100 provides additional retention and protection of auxiliary add-in cards 110A and B.

Figure 5:
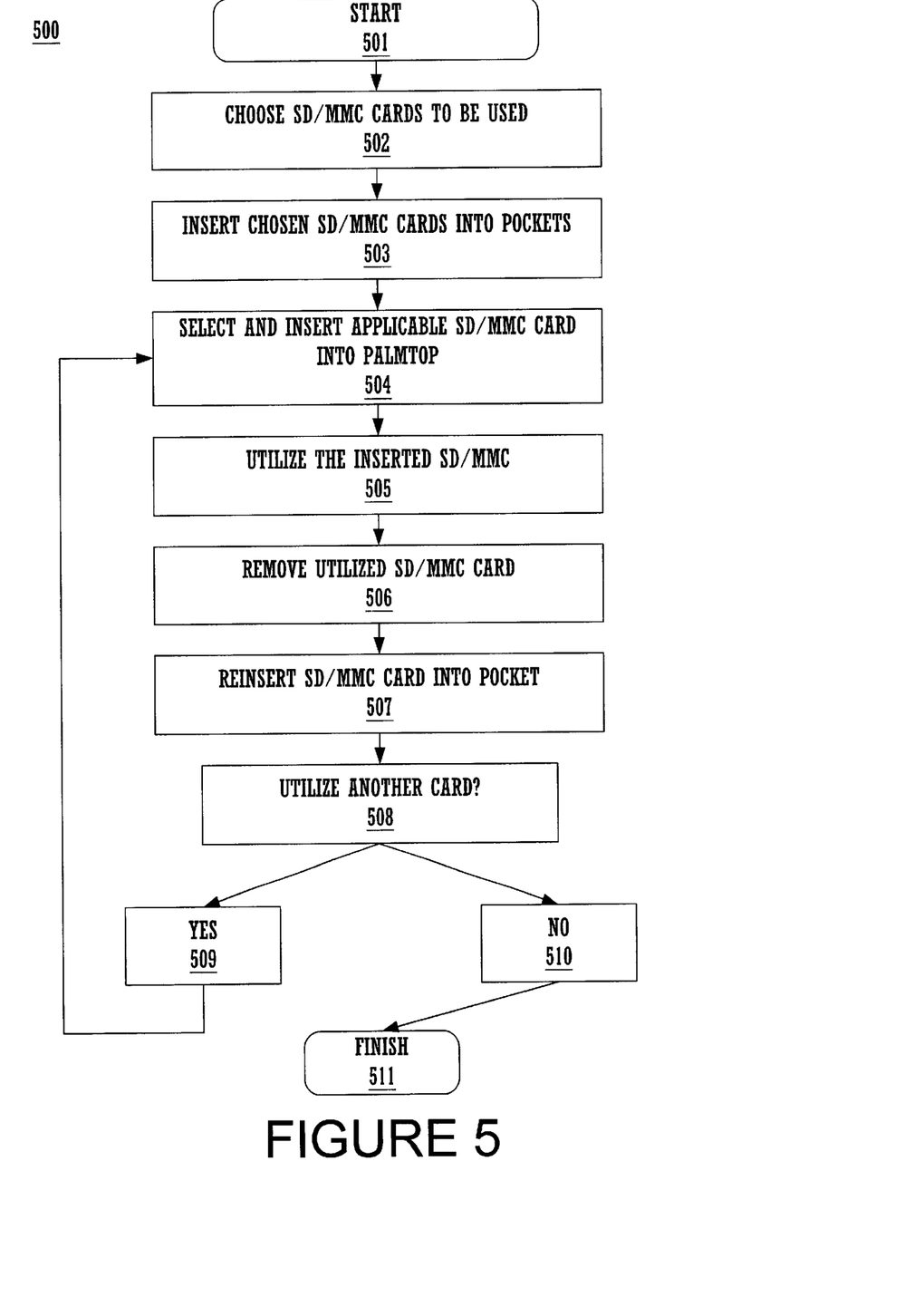
FIG. 5 is a flowchart showing the steps in process 500 for utilizing an apparatus for storing auxiliary add-in cards in the flip cover of a palmtop computer, in one embodiment of the present invention.

With reference now to FIG. 5, shown is a flow chart depicting the steps of a process 500 utilizing an apparatus for storing spare auxiliary add-in card(s) in the flip cover of a palmtop computer, in accordance with one embodiment of the present invention.

In step 502, in one embodiment, a user selects the various auxiliary add-in cards that they wish to have readily available. This could be a combination of SD cards and MMCs or it could be all SDs or all MMCs, or a combination of add-in cards having a similar size and shape of the SD or MMCs. The choice of which cards to select is left to the user and their anticipated tasks that will be performed.

In step 503, in the present embodiment, the user then inserts into the sleeves, provided by the apparatus for storing spare auxiliary add-in cards, the auxiliary add-in cards the user has previously chosen, thereby conveniently, securely, and protectively storing those cards for use when necessary.

In step 504, in the present embodiment, the user chooses the appropriate auxiliary add-in card for the task to be completed which is stored in the provided sleeves and inserts the selected auxiliary add-in card into the expansion slot contained within the palmtop computer.

In step 505, in the present embodiment, by virtue of inserting the selected auxiliary add-in card into the expansion slot, the user begins to utilize the information or function contained within the auxiliary add-in card.

In step 506, in the present embodiment, once the user has completed their respective task(s), the user then ejects the inserted auxiliary add-in card from the expansion slot of the palmtop computer, thereby ceasing utilization of the inserted auxiliary add-in card.

In step 507, in the present embodiment, once the previously selected auxiliary add-in card has been removed from the expansion slot of the palmtop computer, the user then replaces the auxiliary add-in card into the sleeve from where it was originally placed, conveniently, securely, and protectively storing it for future use.

In step 508, in the present embodiment, the user then decides if another stored auxiliary add-in card is to be utilized, and if so, chooses the appropriate auxiliary add-in card and proceeds again from step 504. If the user deems it unnecessary to insert another stored auxiliary add-in card into the expansion slot of the palmtop computer, the user just closes the flip cover, knowing the previously chosen auxiliary add-in cards are securely stored, protected from incidental damage or loss, and conveniently accessible should the need arise to again utilize their information or function.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus to provide storage capabilities for a palmtop computer, said apparatus comprising:

a thin storage unit removeably attached to said palmtop computer; and wherein said thin storage unit comprises a sleeve portion for receiving an auxiliary add-in card.

2. The apparatus of claim 1 wherein said sleeve portion of said thin storage unit is approximately the same length and width as said auxiliary add-in card.

3. The apparatus of claim 1 wherein said sleeve portion is further adapted to separately store said auxiliary add-in card using friction retention.

4. The apparatus of claim 1 wherein said sleeve portion of said thin storage unit is configured to provide retention of said auxiliary add-in card.

5. The apparatus of claim 1 wherein said sleeve portion of said thin storage unit is configured to provide protection against damage of said auxiliary add-in card.

6. The apparatus of claim 1 wherein said thin storage unit is disposed within the inside surface of a detachable front cover of said palmtop computer.

7. The apparatus of claim 1 wherein said thin storage unit is configured to avoid contact with a display portion of said palmtop computer when said front cover is closed.

8. The apparatus of claim 1 wherein said thin storage unit is disposed upon an external surface of said palmtop computer.

9. The apparatus of claim 1 wherein said sleeve portion of said thin storage unit is made of a clear composition.

10. The apparatus of claim 1 wherein said sleeve portion of said thin storage unit is made of an opaque composition.

11. The apparatus of claim 1 wherein said auxiliary add-in card is configured as a SD (secure digital) card.

12. The apparatus of claim 1 wherein said auxiliary add-in card is configured as a MMC (multi-media card) card.

13. An apparatus to provide storage of auxiliary add-in cards for a portable electronic device, said apparatus comprising:

a storage mechanism, configured to be attached to said portable electronic device, said storage mechanism disposed upon a surface area of said portable electronic device, said storage mechanism further comprising a sleeve portion, said sleeve portion configured to receive auxiliary add-in cards.

14. The apparatus of claim 13 wherein said storage apparatus is disposed within an inside surface area of a front cover of said portable electronic device.

15. The apparatus of claim 13 wherein said storage apparatus is disposed upon an external surface area of said palmtop computer.

16. The apparatus of claim 13 wherein said sleeve portion is made of a clear composition.

17. The apparatus of claim 13 wherein said sleeve portion is made of an opaque composition.

18. The apparatus of claim 13 wherein said sleeve portion is made of a mylar composition.

19. The apparatus of claim 13 wherein said sleeve portion is made of a polycarbonate composition.

20. The apparatus of claim 13 wherein said sleeve portion is made of a cellophane composition.

21. The apparatus of claim 13 wherein said sleeve portion is made of a polystyrene composition.

22. The apparatus of claim 13 wherein said sleeve portion is made of a polyvinyl composition.

23. An apparatus for storing cards comprising:

a cover having a recessed portion therein, said cover for removeably attaching to an electronic device for protecting a surface thereof; and a sleeve portion attached to said cover partially over said recessed portion providing a pocket to receive and retain a card.

24. The apparatus as described in claim 23 wherein said pocket retains said card with friction force.

25. The apparatus as described in claim 23 wherein said sleeve portion is clear, allowing a user to view a label of an inserted card.

26. The apparatus as described in claim 23 wherein said pocket is of a length and width to retain an auxiliary add-in card.

27. The apparatus as described in claim 23 wherein said sleeve portion provides multiple pockets arranged for receiving and retaining multiple auxiliary add-in cards.

28. The apparatus as described in claim 23 wherein said pocket is located on said cover such that said pocket aligns partially within an indentation associated with said surface of said electronic device when said cover is closed.

29. The apparatus as described in claim 23 wherein said electronic device is a personal digital assistant (PDA).

30. The apparatus as described in claim 23 wherein said surface of said electronic device is the display surface.

* * * * *